United States Patent [19]

Bunker

[11] Patent Number: 5,472,226
[45] Date of Patent: * Dec. 5, 1995

[54] WALKING BEAM BUSHING

[76] Inventor: Donald D. Bunker, 28182 Palmada, Mission Viejo, Calif. 92691

[*] Notice: The portion of the term of this patent subsequent to Jan. 4, 2011, has been disclaimed.

[21] Appl. No.: 209,534

[22] Filed: Mar. 9, 1994

[51] Int. Cl.⁶ .................. B60G 5/02; F16F 1/38
[52] U.S. Cl. ........................ 280/681; 267/141.3
[58] Field of Search .................. 248/573, 592, 248/608, 635; 267/141, 141.1–141.4, 141.7, 153, 257, 258, 292, 293; 280/677, 681, 723, 725

[56] References Cited

U.S. PATENT DOCUMENTS

| | | | |
|---|---|---|---|
| 2,654,619 | 11/1953 | Kishline et al. | 267/293 |
| 3,784,180 | 1/1974 | Massinger | 267/293 X |
| 3,856,325 | 12/1974 | Willetts | 280/124 R |
| 4,575,114 | 3/1986 | Camp | 280/673 |
| 4,809,960 | 3/1989 | Kakimoto et al. | 267/293 X |
| 4,840,395 | 6/1989 | Sturmon | 280/688 |
| 4,943,092 | 7/1990 | Haraguchi | 280/723 X |
| 5,058,867 | 10/1991 | Hadano et al. | 267/141.7 X |
| 5,100,114 | 3/1992 | Reuter et al. | 267/293 |
| 5,275,429 | 1/1994 | Bunker | 280/688 |

FOREIGN PATENT DOCUMENTS 953644  12/1949  France .................. 267/141.2

Primary Examiner—Robert J. Oberleitner
Assistant Examiner—Alfred Muratori
Attorney, Agent, or Firm—Stetina Brunda & Buyan

[57] ABSTRACT

The present invention relates to an improved walking beam assembly for use in the rear suspension of a heavy-duty vehicle. The walking beam assembly is constructed in a manner wherein the bushing segments incorporated therein may be easily removed and replaced. Such ease of replacement is facilitated by the polyurethane construction of the bushing segments. When inserted into the vehicle suspension, the walking beam incorporating the bushing segments is prevented from moving laterally relative the vehicle frame.

10 Claims, 2 Drawing Sheets

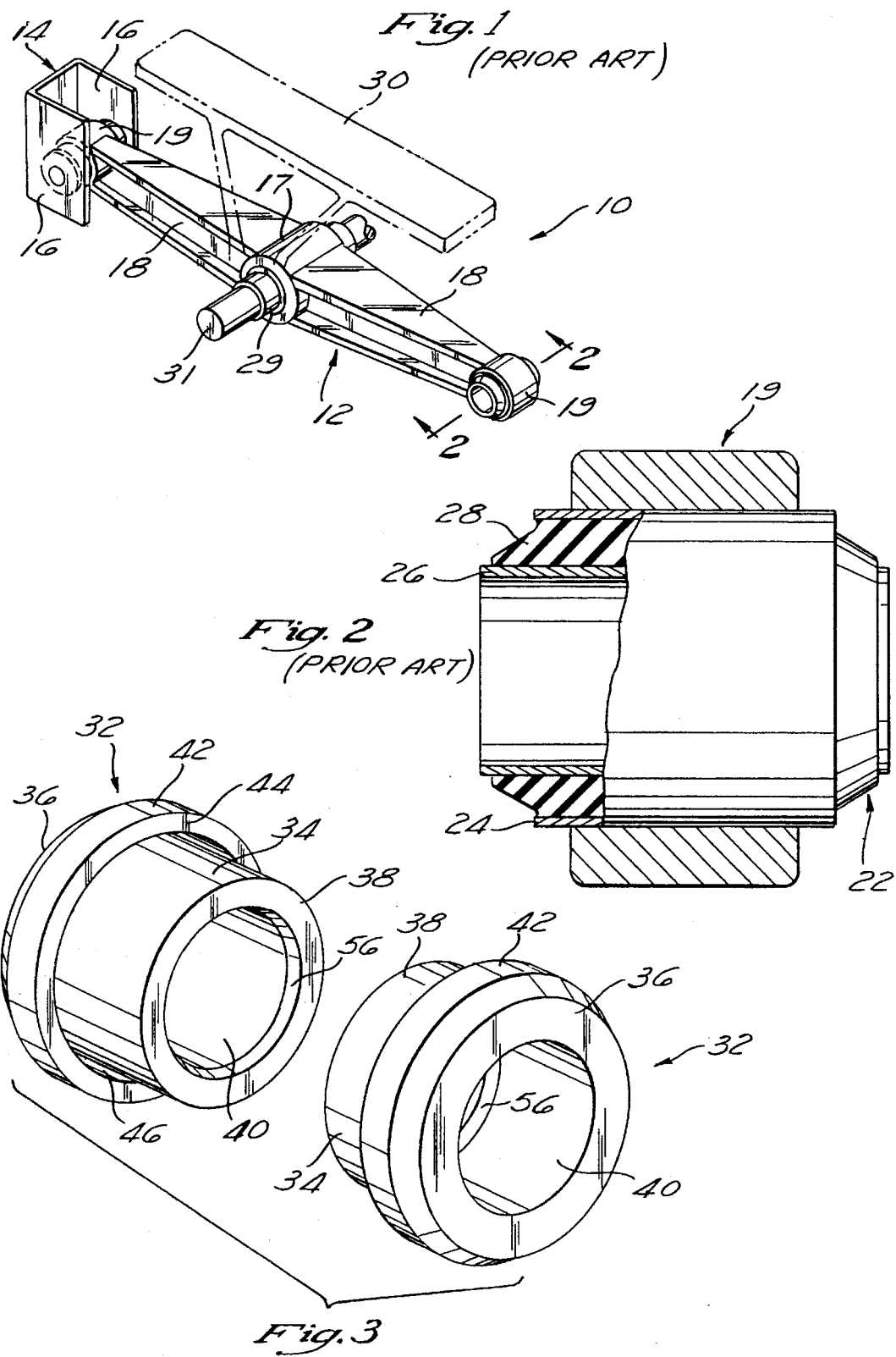

WALKING BEAM BUSHING

FIELD OF THE INVENTION

The present invention relates generally to heavy duty vehicular suspension components, and more particularly to an improved walking beam assembly incorporating easily replaceable end bushings.

BACKGROUND OF THE INVENTION

Incorporated into the rear suspension of heavy duty vehicular equipment such as refuse trucks, cement mixers and dump trucks is a component commonly referred to as a walking beam. Those heavy duty vehicles which incorporate walking beams typically include a pair used in conjunction with the rear tandem axles of the vehicle. The inclusion of the walking beams in the suspension system is made necessary by the extremely high weight loads which are typically exerted on the vehicle frame of such heavy duty vehicles.

Each of the two (2) walking beams incorporated into the vehicle suspension has an elongate configuration and defines a pair of apertures extending laterally through the opposed ends portions thereof. Additionally, extending laterally through the approximate center of each walking beam is a central aperture. The walking beams are connected to a pair of center beams of the vehicle via an elongate shaft, the opposed ends of which are extended through the axially aligned central apertures of the walking beams. Each walking beam is extended between and bolted to a pair of hanger brackets which are attached to the rear tandem axle housings of the vehicle.

The walking beam typically includes a pair of identically configured end bushings which are disposed within the apertures located adjacent the opposed ends thereof. In walking beam assemblies as currently known and manufactured, each of the two end bushings comprises a concentric pair of tubular steel sleeves having a layer of rubber therebetween. The outer diameter of the outer sleeve slightly exceeds the diameter of the walking beam aperture into which the end bushing is inserted. As such, each of the two end bushings is typically press-fit into a respective aperture of the walking beam via the utilization of a heavy tonnage press or similar device. The overall length of the outer sleeve slightly exceeds the depth of the walking beam aperture, with the inner sleeve having a length greater than the outer sleeve. Thus, when each end bushing is press-fit into a respective aperture, the opposed ends of the outer sleeve protrude slightly axially from each end of the aperture into which the end bushing is inserted, with the opposed ends of the inner sleeve protruding axially outward from each end of the outer sleeve. When the walking beams are attached to the vehicle frame via the center beam, the inner sleeves of the end bushings of one walking beam of the pair are coaxially aligned with respective ones of the inner sleeves of the end bushings of the other walking beam of the pair.

Subsequent to the press fit of the end bushings into the walking beams and the attachment thereof to the vehicle frame in the aforementioned manner, the rear tandem axles are extended through respective ones of the axle housings. The hanger brackets of each pair between which each walking beam is extended are provided with apertures to accommodate the fastening bolts used to attach the end bushings thereto. Examples of prior art walking beams include those sold by Hendrickson as Model Nos. 6969 and 45900 as well as those sold by Navistar as Model Nos. 124865R1 and 124892R1. Additionally, examples of end bushings commonly utilized include those sold by Hendrickson as Model No. 29878-1, and those sold by Euclid as Model Nos. E-1341A and E-2771.

When each walking beam is mounted between a respective pair of hanger brackets, the brackets themselves, which are typically U-shaped, initially come into contact with only the inner sleeves of the end bushings. However, over extended periods of time, the layer of rubber disposed intermediate the inner and outer sleeves of the end bushings will wear and dry out (i.e., crack and degrade), thereby allowing the outer sleeve, and hence the walking beam into which the outer sleeve is press fit, to chatter (i.e., move relative the rubber layer and travel radially and laterally therealong). Such movement typically results in a decrease of vibration dampening, and oftentimes results in the rear tires rubbing the chassis of the vehicle, particularly during turns. As such, the wearing of the rubber layer gives rise to overall diminished vehicle handling as well as increased wear of the remaining components of the suspension.

In walking beam assemblies as currently known and manufactured, once one or both of the two end bushings disposed within the walking beam become worn, the walking beam must be removed from the vehicle and the end bushings removed from therewithin. As will be recognized, due to the loss of elasticity in the rubber layer, both the rubber layer and the inner sleeve are easily removed from within the walking beam. However, the removal of the existing outer sleeve of the end bushing from within its respective aperture presents a significantly more difficult task, and generally requires the utilization of a heavy ton press (e.g., 80–100 tons) to remove the outer sleeve from within the aperture. Thereafter, a new end bushing must be press-fit into the walking beam in the aforementioned manner, which is also a difficult and time-consuming task. As can be appreciated, the costs associated with the repair procedure would be significantly decreased if the end bushings of the walking beam could be removed and replaced without the necessity of having to utilize a heavy tonnage press. Thus, there exists a need in the art for a walking beam assembly wherein the end bushings are adapted to be easily and quickly replaceable.

SUMMARY OF THE INVENTION

In accordance with a preferred embodiment of the present invention, there is provided an improved vehicle suspension walking beam assembly for use in a heavy duty vehicle such as a cement mixer, refuse truck or dump truck. The walking beam assembly generally comprises an elongate walking beam which is extensible between a pair of hanger brackets. The walking beam defines first and second opposed ends, and includes first and second apertures extending laterally therethrough adjacent the first and second ends.

The walking beam assembly further comprises a first pair of bushing segments which are slidably insertable into the opposed ends of the first aperture and a second pair of bushing segments which are slidably insertable into the opposed ends of the second aperture. In the preferred embodiment, each of the bushing segments of the first and second pairs defines a distal end which is slidably insertable into one end of a respective one of the apertures, and a proximal end having a laterally extending flange formed about the periphery thereof. The flanges of the bushing segments are preferably abutted against the walking beam when the distal ends thereof are fully received into the apertures, and disposed between the walking beam and the opposed side walls of a respective one of the hanger brackets in a manner preventing contact therebetween when the walking beam is extended between the hanger brackets.

The flange of each of the bushing segments of the first and second pairs preferably includes an annular groove disposed therein which is sized and configured to receive a portion of the walking beam. Additionally, each of the annular grooves preferably includes a chamfer formed therein for preventing the portion of the walking beam disposed within the annular groove from damaging the bushing segment. Further, each of the bushing segments of the first and second pairs includes an aperture extending longitudinally therethrough. In this respect, when the bushing segments of the first pair are inserted into the opposed ends of the first walking beam aperture, the apertures thereof are coaxially aligned. Similarly, when the bushing segments of the second pair are inserted into the opposed ends of the second walking beam aperture, the apertures thereof are also coaxially aligned.

In addition to the walking beam and bushing segments, the walking beam assembly further comprises a pair of tubular inserts which are slidably insertable into the coaxially aligned apertures of a respective pair of the bushing segments. In the preferred embodiment, the distal end of each bushing segment aperture is chamfered to aid in the extension of the tubular inserts through the coaxially aligned apertures of the first and second pairs.

In the walking beam assembly, the tubular inserts are preferably fabricated from steel, while the bushing segments are preferably fabricated from polyurethane. Additionally, each of the bushing segments preferably has a generally circular cross-sectional configuration.

It is an object of the present invention to provide a walking beam assembly wherein the end bushings disposed within the walking beam may be easily and quickly replaced.

A further object of the present invention is to provide a walking beam assembly including bushing segments adapted to prevent the walking beam from chattering and causing the rear tires to rub against the vehicle chassis.

Another object of the present invention is to provide improved bushing segments for retrofit applications in walking beams produced as original equipment on conventional heavy-duty trucks.

BRIEF DESCRIPTION OF THE DRAWINGS

These as well as other features of the present invention will become more apparent upon reference to the drawings wherein:

FIG. 1 is a perspective view of a walking beam assembly constructed in accordance with the prior art;

FIG. 2 is a cross-sectional view taken along line 2—2 of FIG. 1, illustrating the structure of a prior art end bushing incorporated into the prior art walking beam;

FIG. 3 is a perspective view of the bushing segments of the present invention utilized as an alternative to the prior art end bushing shown in FIG. 2;

DETAILED DESCRIPTION OF THE PREFERRED EMBODIMENT

Figure 4:
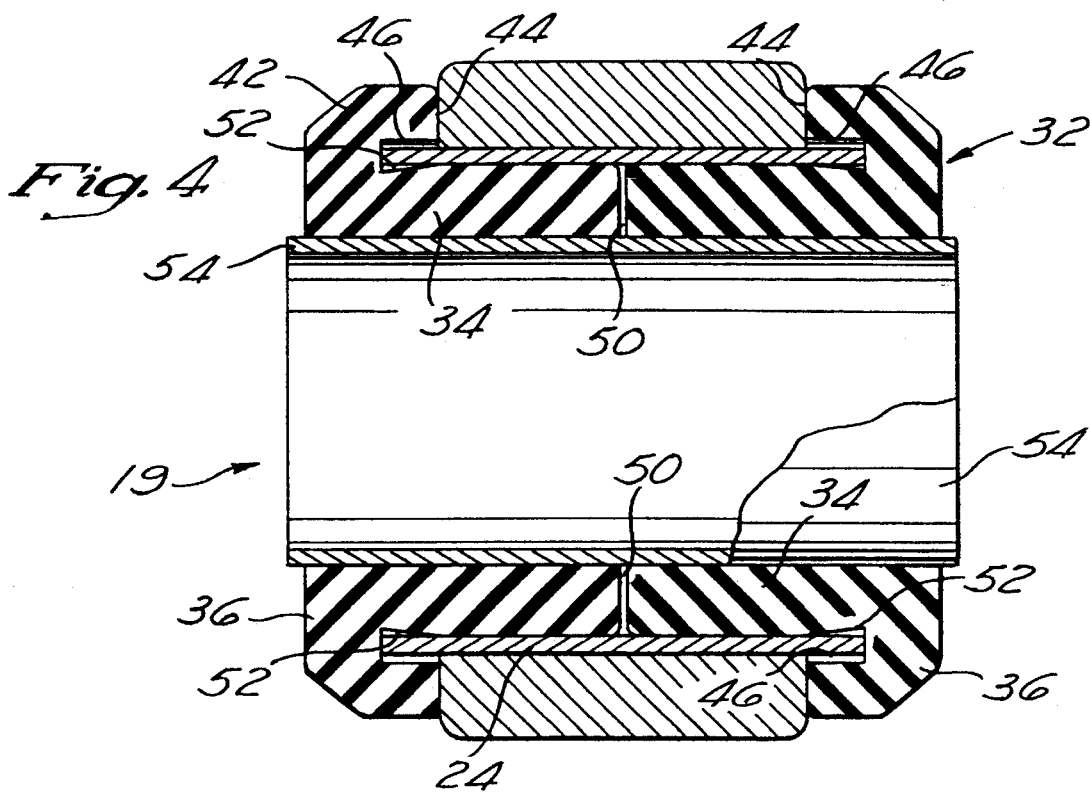
FIG. 4 is a cross-sectional view of the walking beam illustrating the bushing segments of the present invention as operatively inserted into one of the two opposed bushing apertures disposed within the walking beam.

Referring now to the drawings wherein the showings are for purposes of illustrating a preferred embodiment of the present invention only, and not for purposes of limiting the same, FIG. 1 perspectively illustrates a prior art walking beam assembly 10 which is used in conjunction with the rear suspension of heavy-duty vehicles such as cement mixers, refuse trucks, dump trucks and the like. The walking beam assembly 10 generally comprises an elongate walking beam 12 which is extended between a first hanger bracket 14 and a second hanger bracket (not shown). Typically, the first hanger bracket 14 and second hanger bracket have generally U-shaped configurations and include opposed side walls 16 which are disposed in spaced, generally parallel relation. The first hanger bracket 14 and second hanger bracket form a portion of the suspension system associated with the rear tandem axle housings of the vehicle.

The walking beam 12 is typically constructed from a single piece of metal formed from a forging or casting operation. In particular, the walking beam 12 comprises a cylindrically configured central portion 17 which includes a center beam aperture extending axially therethrough. Extending laterally from the central portion 17 in opposed relation is a pair of elongate, identically configured struts 18. Formed on the distal ends of the struts 18 is a pair of cylindrically configured, tubular housings 19, each of which define a bushing aperture extending laterally therethrough. As seen in FIG. 1, the opposed end portions of the housings 19 protrude laterally beyond the distal ends of the struts 18 upon which they are formed.

Referring now to FIG. 2, illustrated is a prior art end bushing 22 utilized with the walking beam 12 previously described. The prior art walking beam assembly 10 incorporates a pair of identically configured end bushings 22 which are inserted into respective ones of the bushing apertures defined by the housings 19. The end bushings 22 each comprise an outer sleeve 24 and an inner sleeve 26, each of which are made of steel. Disposed intermediate the outer sleeve 24 and inner sleeve 26 is a rubber layer or plug 28 which is firmly mounted between the inner surface of the outer sleeve 24 and the outer surface of the inner sleeve 26 under a substantial pre-load. Typically, the outer diameter of the outer sleeve 24 is sized so as to slightly exceed the inner diameter of each bushing aperture of the walking beam 12. As such, in the walking beam assembly 10, the end bushings 22 are press-fit into the bushing apertures through the utilization of a heavy tonnage press or similar device. As seen in FIG. 2, the overall length of the outer sleeve 24 slightly exceeds the depth of the bushing aperture, thus causing the opposed ends thereof to project radially outward from each end of the bushing aperture when the end bushing 22 is properly inserted thereinto. Additionally, the overall length of the inner sleeve 26 exceeds the length of the outer sleeve 24, thus causing the opposed ends thereof, as well as the opposed end portions of the rubber layer 28, to protrude radially outward beyond each end of the outer sleeve 24 when the end bushing 22 is properly inserted, i.e. press-fit, into the bushing aperture.

Inserted into the center beam aperture of the walking beam 12 is a center bushing 29 which is configured identically to, but larger in size than, the previously described end bushings 22. In this respect, the center bushing 29 comprises outer and inner sleeves having a hard rubber layer firmly mounted therebetween. Like the outer sleeve 24 of the end bushing 22, the outer diameter of the outer sleeve of the center bushing 29 is sized so as to slightly exceed the inner diameter of the center beam aperture. As such, the center bushing 29 is also press-fit into the center beam aperture through the utilization of a heavy tonnage press or similar device. The overall length of the outer sleeve of the center bushing 29 slightly exceeds the depth of the center beam aperture, thus causing the opposed ends thereof to project radially outward from each end of the center beam aperture when the center bushing 29 is properly inserted thereinto. Since the overall length of the inner sleeve of the center bushing 29 exceeds the length of its outer sleeve, the opposed ends thereof, as well as the opposed end portions of the rubber layer, will protrude radially outward beyond each end of the outer sleeve when the center bushing 29 is press-fit into the center beam aperture.

In the rear suspension of the vehicle, a pair of walking beams 12 are suspended from respective ones of a pair of center beams 30 attached to the vehicle frame. The attachment of the walking beams 12 to the center beams 30 is facilitated by an elongate shaft 31 which extends through the coaxially aligned inner sleeves of the center bushings 29. As previously indicated, each walking beam 12 is additionally positioned between a first hanger bracket 14 and a second hanger bracket. The rear tandem axle housings of the vehicle are attached to the hanger brackets, with the rear wheels of the vehicle being disposed at the opposed ends of the rear tandem axle housings. Since the housings 19 of each walking beam 12 typically reside within respective hanger brackets of each pair, each of the hanger brackets includes a pair of coaxially aligned apertures disposed within the opposed side walls 16 thereof which are coaxially aligned with the inner sleeve 26 of the bushing 22 for allowing the end bushing 22 to be bolted to a respective hanger bracket.

As previously discussed, over extended periods of time, the rubber layer 28 of each end bushing 22 of the prior art will typically wear and shrink, thereby allowing the outer sleeve 24, and hence the walking beam 12 into which the outer sleeve 24 is press-fit, to travel radially and laterally along the rubber layer 28. Such movement (i.e., chattering) typically gives rise to diminished vehicle handling and wear of the suspension components, and oftentimes results in the rear tires rubbing against the vehicle chassis. Additionally, due to its construction, the end bushing 22 works on a torsional principle wherein the rubber layer 28 is torsionally flexed rather than pivoted or rotated. Such flexing of the rubber layer 28 accelerates its degradation. Similar problems occur as a result of the wear of the rubber layer of the center bushing 29.

Like the prior art walking beam assembly 10, the walking beam assembly constructed in accordance with the preferred embodiment of the present invention also includes the walking beam 12. However, as an alternative to the previously described end bushings 22, inserted into each end of the walking beam 12 is a pair of identically configured bushing segments 32. As previously explained, in the prior art technique of repairing the walking beam 12, once the rubber layer 28 of the prior art end bushing 22 becomes worn, both the rubber layer 28 and inner sleeve 26 are removed from within the bushing aperture, with the outer sleeve 24 subsequently being removed from within the bushing aperture through the utilization of a heavy tonnage press. Thereafter, a new end bushing 22 is press-fit into the bushing aperture. Since the most difficult and time-consuming phases of the repair/replacement procedure are the removal of the existing outer sleeve 24 from the bushing aperture and press-fit of a new end bushing 22 thereinto, the bushing segments 32 are adapted to be slidably insertable into the opposed ends of the outer sleeve 24 of a previously installed end bushing 22 subsequent to the removal of the rubber layer 28 and inner sleeve 26 therefrom. As such, the bushing segments 32 are used primarily as replacement parts since they are preferably inserted into an existing outer sleeve 24 mounted within the walking beam 12. Advantageously, since the outer sleeve 24 is maintained within the walking beam 12, the difficult and time consuming task of removing the same from within the bushing aperture via the heavy tonnage press is eliminated.

In the preferred embodiment, each bushing segment 32 comprises a cylindrically configured main body portion 34 defining a proximal end 36 and a distal end 38. Extending axially through the body portion 34 of each bushing segment 32 is an aperture 40. Additionally, formed about the periphery of the proximal end 36 of each bushing segment 32 is a laterally extending, circular flange 42. The outer diameter of the body portion 34 of each bushing segment 32 is preferably slightly larger than the inner diameter of the outer sleeve 24 into which the bushing segments 32 are inserted. However, the bushing segments 32 are slidably insertable into the opposed ends of the outer sleeve 24 through the application of hand pressure to the circular flanges 42 thereof. Once again, since the bushing segments 32 are slidably insertable into the outer sleeve 24 of the previously installed end bushing 22, the two most difficult and time consuming phases of the prior art replacement procedure (i.e., the removal of the outer sleeve 24 from the bushing aperture and press-fit of a new end bushing 22 thereinto) are eliminated through the utilization of the bushing segments 22. The bushing segments 32 are preferably constructed from polyurethane, though alternative materials having similar material property characteristics may also be utilized.

Figure 5:
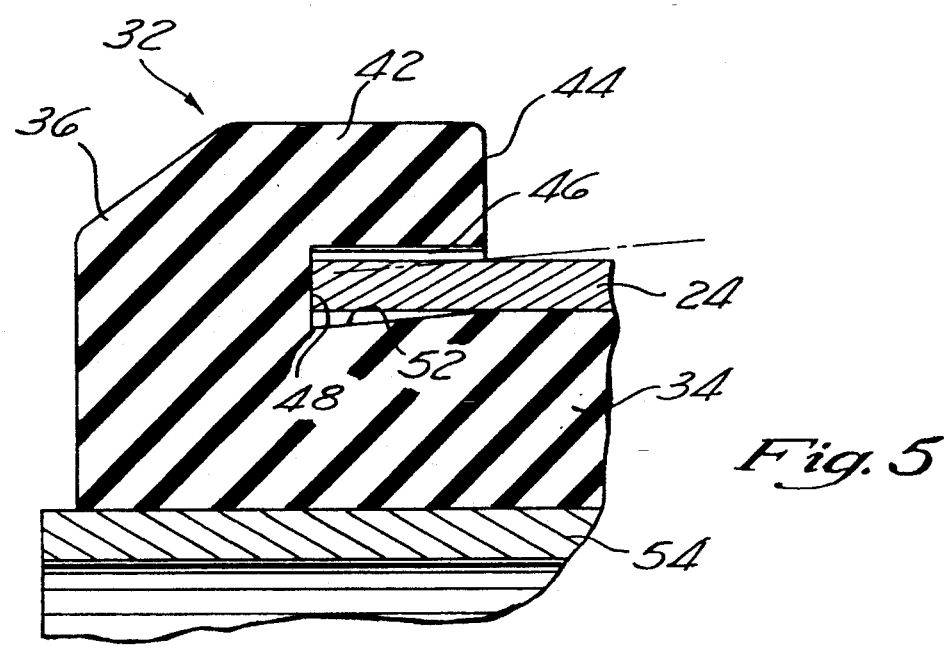
FIG. 5 is a partial cross-sectional view illustrating the receipt of a portion of the walking beam into an annular groove disposed within each of the bushing segments.

As best seen in FIGS. 4 and 5, disposed in the inner surface 44 of the flange 42 is an annular groove 46 which is sized and configured to receive a portion of the walking beam 12, and more particularly, an end portion of a respective one of the outer sleeves 24. Due to the receipt of the end portions of the outer sleeves 24 into the annular grooves 46 of the bushing segments 32, the flanges 42 of the bushing segments 32 are always disposed intermediate the walking beam 12 and the opposed side walls 16 of the hanger brackets, thus preventing any lateral movement of the walking beam 12 therebetween. As previously explained, though the main body portion 34 of each bushing segment 32 has an outer diameter slightly exceeding the inner diameter of the outer sleeve 24, the bushing segments 32 are still slidably insertable into the outer sleeves 24 by simply applying hand pressure thereto. The distal ends 38 of the bushing segments 32 are slidably inserted into the opposed ends of a respective one of the outer sleeves 24, with the radially protruding end portions of the outer sleeve 24 being slidably received into the annular grooves 46 disposed within the bushing segments 32. The receipt of the distal ends 38 of the bushing segments 32 into the opposed ends of the outer sleeve 24 is limited by the abutment of the end portions of the outer sleeve 24 against the inner surfaces 48 of the grooves 46. As seen in FIG. 4, the main body portions 34 of the bushing segments 32 are sized such that when the bushing segments 32 are fully received into the outer sleeve 24, i.e. the end portions of the outer sleeve 24 are abutted against the inner surfaces 48 of the grooves 46, the distal ends 38 of the bushing segments 32 are separated by a narrow gap 50. Additionally, as seen in FIG. 5, formed within each of the annular grooves 46, and more particularly within the outer surface of the main body portion 34, is a chamfer 52, the use of which will be discussed in more detail below.

When the bushing segments 32 are inserted into the opposed ends of each of the outer sleeves 24 remaining within the bushing apertures of the walking beam 12, the apertures 40 extending axially through the bushing segments 32 are in substantial coaxial alignment. Slidably inserted into the coaxially aligned apertures 40 of the bushing segments 32 disposed within each of the outer sleeves 24 is an elongate, tubular sleeve insert 54 which is preferably fabricated from steel. Each tubular sleeve insert 54 is the structural equivalent of the inner sleeve 26 of the prior art end bushing 22 and is adapted to slidably accommodate an end portion one of the previously described rear tandem axles 15. The outer diameter of the tubular insert 54 is slightly larger than the inner diameter of the coaxially aligned apertures 40 of the pair of bushing segments 32 into which it is inserted. In view of the slight interference between the tubular insert 54 and the bushing segments 32 and the resistance created by the traction of the insert 54 on the inner diameters of the bushing segments 32, the insert 54 is slidably inserted into the coaxially aligned apertures 40 via the utilization of a standard light duty press. As seen in FIG. 3, to aid in the extension of the tubular insert 54 through the coaxially aligned apertures 40 of each pair of bushing segments 32, formed about the periphery of the distal end of each aperture 40, i.e. within the inner surface of the bushing segment 32 defining the aperture 40, is a slight chamfer 56. Advantageously, the chamfers 56 formed within the coaxially aligned apertures 40 prevents an end of the tubular insert 54 from inadvertently being received into the gap 50 defined between the bushing segments 32, and thus becoming obstructed by the distal end 38 of the one of the bushing segments 32.

Due to the polyurethane construction of the bushing segments 32, the segments 32 possess resiliency and flexibility so as to dampen some of the shock and load exerted on the walking beam 12 by the frame 30. Importantly, the formation of the chamfers 52 within the annular grooves 46 prevents the end portions of the outer sleeve 24 received thereinto from cutting and tearing into the main body portion 34 of each bushing segment 32 as the bushing segment 32 is flexed and distorted during the shock dampening process. Since the bushing segments 32 are not press-fit into the opposed ends of the outer sleeves 24, but rather are slidably inserted thereinto, once the bushing segments 32 exhibit excessive wear, the same may be easily replaced without the necessity of expensive and time-consuming repair operations. Additionally, rather than working on a torsional principle, the bushing segments 32 are free to pivot or rotate within the outer sleeve 24, with the insert 54 itself being free to pivot or rotate within the coaxially aligned apertures 40.

Since the removal and replacement of the center bushing 29 of the prior art walking beam assembly 10 presents the same problems as those encountered with the removal and replacement of the end bushings 22, the walking beam assembly of the present invention includes an identically configured pair of central bushing segments which are used as an alternative to the center bushing 29 and slidably inserted into central portion 17 of the walking beam 12. In particular, the central bushing segments are slidably inserted into the opposed ends of the outer sleeve of the center bushing 29 subsequent to the removal of the worn rubber layer and inner sleeve therefrom. The central bushing segments are configured identically to, but are larger in size than, the previously described bushing segments 32, since the same are inserted into the larger outer sleeve of the center bushing 29. The engagement of the central bushing segments to the outer sleeve of the center bushing 29 and walking beam 12 occurs in the same manner as previously discussed in relation to the bushing segments 32 and outer sleeves 24. Once inserted into the outer sleeve of the center bushing 29, the flange portions of the central bushing segments prevent the central portion 17 of the walking beam 12 from moving laterally relative the frame 30.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. An improved vehicle suspension walking beam assembly, comprising:

an elongate walking beam defining first and second opposed ends, a first aperture extending laterally through said walking beam adjacent said first end and a second aperture extending laterally through said walking beam adjacent said second end, said walking beam being extensible between a pair of hanger brackets, each of which comprises opposed side walls disposed in spaced, generally parallel relation;

a first pair of bushing segments slidably insertable into opposed ends of said first aperture; and a second pair of bushing segments slidably insertable into opposed ends of said second aperture;

wherein each of the bushing segments of said first and second pairs defines a distal end slidably insertable into one end of a respective one of said apertures and a proximal end having a laterally extending flange formed about the periphery thereof, the flanges of each of the bushing segments of the first and second pairs including an annular groove disposed therein which is sized and configured to receive a portion of said walking beam;

the flanges of said bushing segments being abutted against said walking beam when the distal ends thereof are fully received into respective ones of said first and second apertures and disposed between the walking beam and the opposed side walls of respective ones of said hanger brackets in a manner preventing contact therebetween when the walking beam is extended between the hanger brackets.

2. The walking beam assembly of claim 1 wherein each of said annular grooves includes a chamfer formed therein for preventing the portion of the walking beam disposed within the annular groove from damaging the bushing segment.

3. The walking beam assembly of claim 1 wherein each of the bushing segments of the first and second pairs includes an aperture extending longitudinally therethrough, the apertures of the bushing segments of the first pair being coaxially aligned when the first pair of bushing segments are inserted into the opposed ends of the first aperture, and the apertures of the bushing segments of the second pair being coaxially aligned when the second pair of bushing segments are inserted into the opposed ends of the second aperture.

4. The walking beam assembly of claim 3 further comprising:

a first tubular insert slidably insertable into the coaxially aligned apertures of said first pair of bushing segments; and a second tubular insert slidably insertable into the coaxially aligned apertures of said second pair of bushing segments.

5. The walking beam assembly of claim 4 wherein the distal end of each of said bushing segment apertures is chamfered to aid in the extension of the first and second tubular inserts through the coaxially aligned apertures disposed within the bushing segments of the first and second pairs.

6. The walking beam assembly of claim 4 wherein said first and second tubular inserts are fabricated from steel.

7. The walking beam assembly of claim 1 wherein each of the bushing segments of the first and second pairs is fabricated from polyurethane.

8. The walking beam assembly of claim 1 wherein the bushing segments of the first and second pairs each have a generally circular cross-sectional configuration.

9. The walking beam assembly of claim 1 wherein said first and second apertures are each defined by an outer sleeve of an end bushing previously inserted into said walking beam, and the annular grooves of each pair of bushing segments are adapted to receive the opposed end portions of a respective outer sleeve which extend axially from the walking beam.

10. An improved vehicle suspension walking beam assembly, comprising:

an elongate walking beam including first and second apertures extending therethrough, said walking beam being extensible between a pair of hanger brackets, each of which comprises opposed side walls;

a first pair of bushing segments insertable into opposite ends of the first aperture; and a second pair of bushing segments insertable into opposite ends of the second aperture;

each of the bushing segments of the first and second pairs including a radially extending flange having an annular groove disposed therein which is sized and configured to receive a portion of the walking beam;

the flanges of the bushing segments being abutted against the walking beam when the bushing segments are fully received into respective ones of the first and second apertures and disposed between the walking beam and the opposed side walls of respective ones of the hanger brackets in a manner preventing contact therebetween when the walking beam is extended between the hanger brackets.

* * * * *